April 24, 1951 C. C. CLAMP 2,550,186
FLEXIBLE HOSE FOR CONNECTION TO FAUCETS
Filed July 26, 1948
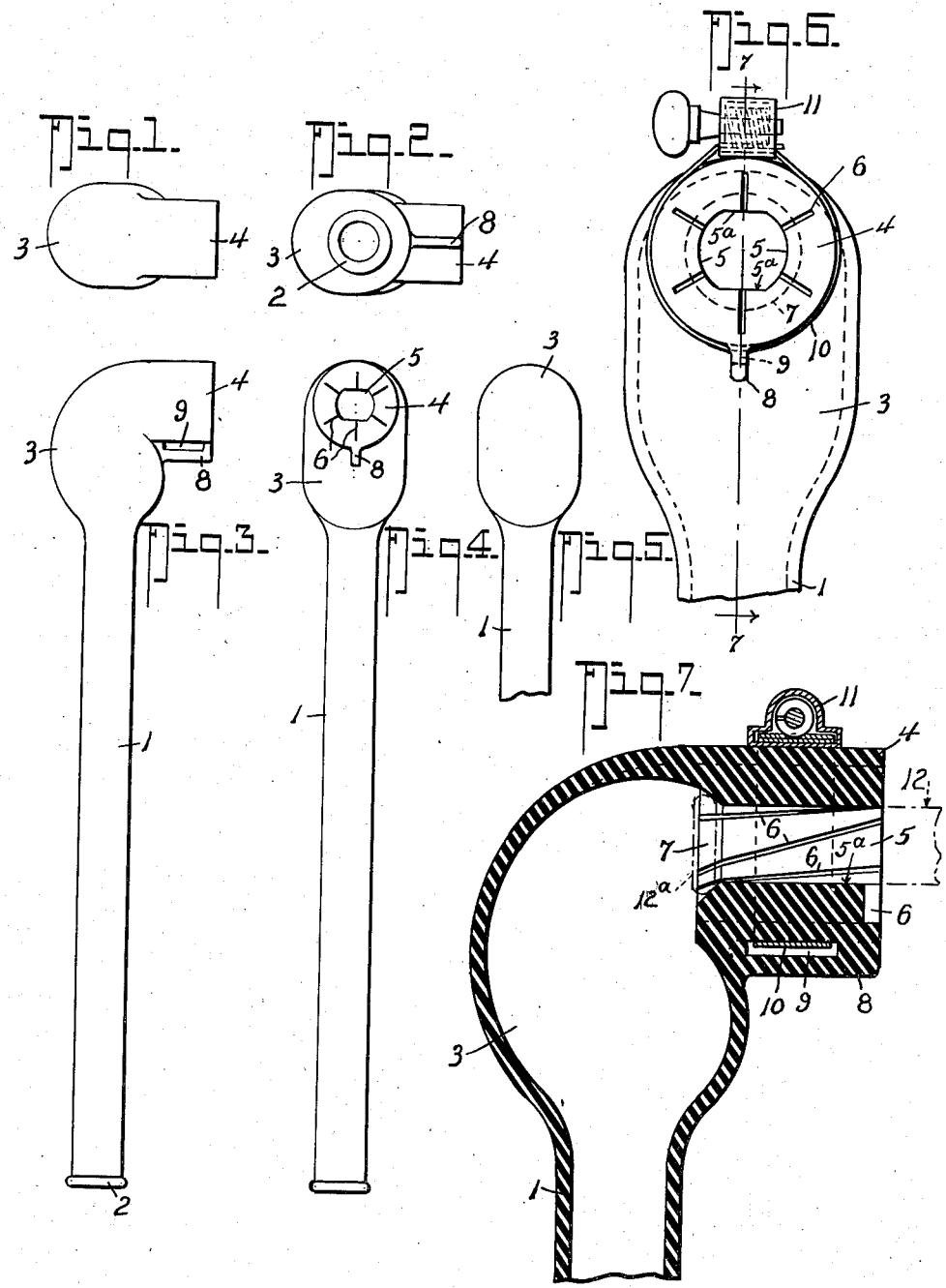
INVENTOR,
Charles C. Clamp
BY
Albert E Dieterich,
ATTORNEY.

Patented Apr. 24, 1951

2,550,186

UNITED STATES PATENT OFFICE 2,550,186

FLEXIBLE HOSE FOR CONNECTION TO FAUCETS

Charles C. Clamp, San Antonio, Tex.

Application July 26, 1948, Serial No. 40,685

9 Claims. (Cl. 285—90)

My invention relates to flexible hoses designed particularly for use with washing machines, other than the automatic type. As most washing machines are used either in the bathroom or in the kitchen it is an object of the invention to provide a hose which will fit nearly all faucets now in use in either place.

While my invention is primarily designed to convey water to a washing machine, its use is not so limited as it may be used for other purposes as well, as, for instance, it may be used in filling five gallon water bottles used on electric water coolers.

To the attainment of the above objects and ends the invention resides, in part, in the construction of the head of the hose, in part in the connection between the head and the hose proper and in part in the novel details of construction, combinations and arrangements of parts all of which will first be described in detail and then be specifically pointed out in the appended claims, reference being had to the accompanying drawings in which:

Fig. 1 is a top plan view of my improved hose without a clamp.

Fig. 2 is an inverted end plan view of the same.

Fig. 3 is a side elevation of the same.

Fig. 4 is a front view of the same.

Fig. 5 is a rear elevation of a portion of the same.

Fig. 6 is an enlarged detail front elevation showing a clamp in place, a faucet being indicated in dot and dash lines.

Fig. 7 is a section on the line 7—7 of Fig. 6.

In the drawing in which like numerals and letters of reference indicate like parts in all the figures, 1 represents the hose proper which at its outlet end is preferably provided with a bead 2 and whose inlet end merges into a bulbous member 3 which in turn merges with the head 4. The axis of the head 4 lies at right angles to and intersects the axis of the hose proper 1.

The head 4 has an axial passage formed between two parallel surfaces 5ª and two arcuate surfaces 5. The head 4 is also provided with a set (preferably six) of slots or slits 6 spaced 60° apart and spiralling 30° in righthand helixes.

The distance between the walls 5ª, 5ª is less than that between walls 5, 5. At the inner end of the passage formed by the walls 5 and 5ª is a conical seat 7 against which the bead 12ª of a beaded faucet 12 (see dot and dash lines Fig. 7) may rest.

The head 4 is provided with a lip 8 having a slot 9 through which the strap 10 of a suitable hose clamp 11 is passed so that the head may be tightened around the faucet to squeeze the slots 6 together and prevent leakage.

The hose clamp 10, 11 illustrated in the drawing is that illustrated in Letters Patent No. 2,346,906 issued April 18, 1944; since the clamp per se is not of my invention further description thereof is thought to be unnecessary in view of the disclosure in the above patent.

When the head is clamped on the faucet and water turned on the force of the water entering the bulb 3 will tend to draw the seat 7 tight against the bead 12ª of the faucet which then acts as a check valve against water leaking back through the head passage around the neck of the faucet. Further, when the clamp is released, the seat 7 will facilitate removal of the hose over the bead 12ª.

The exact shape and size of the bulb 3 is not critical but may be varied without departing from my claimed invention. I prefer, however, a bulb of the shape shown which prevents any sharp angle bends for the water stream and thus affords a more even and quiet flow of water through the hose.

From the foregoing description, taken in connection with the accompanying drawings, it is thought that the construction, operation and advantages of the invention will readily appear to those skilled in the art.

What I claim is:

1. A hose for purposes described comprising a hose proper having an inlet end merging with a hollow bulb, and a head whose outlet end merges with said bulb and is provided with a passage whose axis extends at right angles to the axis of said hose proper, said head having helical slits spaced apart and extending lengthwise of said head passage and communicating with the same.

2. A hose for purposes described comprising a hose proper having an inlet end merging with a hollow bulb, and a head whose outlet end merges with said bulb and is provided with a passage whose axis extends at right angles to the axis of said hose proper, said head having a lip with a slot, and a hose clamp on said head, said clamp having a strap passing through said slot of said lip.

3. A hose for purposes described comprising a hose proper having an inlet end merging with a hollow bulb, and a head whose outlet end merges with said bulb and is provided with a passage whose axis extends at right angles to the axis of said hose proper, said head having helical slits spaced apart and extending outwardly from said head passage and registering with the same, said head having a lip with a slot, and a hose clamp on said head, said clamp having a strap passing through said slot of said lip.

4. A hose for purposes described comprising a hose proper having an inlet end merging with a hollow bulb, and a head whose outlet end merges with said bulb and is provided with a passage whose axis extends at right angles to the axis of said hose proper, said head having for said passage two parallel flat walls and two concave walls at right angles to one another, the flat walls being closer together than the concave walls.

5. A one piece flexible connection comprising a head having a passage, a hollow bulbous portion extending from said head and a hose proper extending from said bulbous portion at a right angle to said head, and an integral slotted lip.

6. A one piece flexible connection comprising a head having a passage, a hollow bulbous portion extending from said head and a hose proper extending from said bulbous portion at a right angle to said head, and an integral slotted lip, said passage being formed by two flat parallel walls connected at their sides by two concave walls.

7. A one piece flexible connection comprising a head having a passage, a hollow bulbous portion extending from said head and a hose proper extending from said bulbous portion at a right angle to said head, and an integral slotted lip, said head having a set of helical slits the length of said passage and merging with the same.

8. A hose for purposes described comprising a hose proper having an inlet end merging with a hollow bulb, and a head whose outlet end merges with said bulb and is provided with a passage whose axis extends at right angles to the axis of said hose proper, said bulb being of a combination of more or less spherical shapes gradually decreasing to the desired character of a true circle at the place where the hose proper joins the bulb.

9. A faucet attachment which comprises a one-piece flexible body that includes a hose proper having an inlet and merging with a hollow bulb, and a head whose outlet end merges with said bulb and is provided with a passage which extends at right angles to the passage of the hose proper, the internal diameter of the bulb being such that if the cross-sectional areas of the two passages are extended into the bulb they would meet in their entirety within the bulb.

CHARLES C. CLAMP.

REFERENCES CITED

The following references are of record in the file of this patent:

UNITED STATES PATENTS

| Number | Name | Date |
| --- | --- | --- |
| Re. 20,706 | Aghnides | Apr. 26, 1938 |
| 470,531 | Aims | Mar. 8, 1892 |
| 561,441 | Schmidt | June 2, 1896 |
| 1,036,015 | Shepherd | Aug. 20, 1912 |
| 1,171,149 | Smith | Feb. 8, 1916 |
| 1,543,558 | Donald | June 23, 1925 |
| 1,588,320 | Komarcstevits et al. | June 8, 1926 |